(12) United States Patent
Hurd

(10) Patent No.: X5704
(45) Date of Patent: Nov. 10, 1829

(54) BOILER, CONSTRUCTING

(76) Inventor: Joseph Jr. Hurd

Joseph Hurd, Jr.

The Schedule referred to in these Letters Patent, & making part of the same, containing a description in the words of the said Joseph Hurd Jr himself; of his improvement in the construction of Ovens with reflectors.

To all persons to whom these Presents shall come, Joseph Hurd Jr. of Boston, in the County of Suffolk, & State of Massachusetts, Gentleman, sends Greeting.

Be it known, that I, the said Joseph Hurd Jr have made and applied to use, a new and useful improvement in the construction of ovens, by applying to them polished tin or other metal, as reflectors by means whereof, the waste of heat is in a great measure prevented, called an Oven with Reflectors. See Fig. 1 & 2, in the Plate. This improvement consists principally in the application of tin or other polished metal, arranged around or partially around the oven, which will reflect back upon it, the heat which would otherwise be lost by radiation or absorption according to the material made use of. The following description of an oven with reflectors, sufficient for a family of 8 to 10 persons will show the manner in which they are constructed. Take for the bottom of the oven a cast iron plate see Fig 1. a, a, a. The front straight & 20 inches. The sides straight and 10 inches. ~~The back~~ - The back semicircular. The top of the oven b, b, b, and its sides are of sheet iron, the joints locked or riveted together. Its height 10 inches. This oven is enclosed except its front in a sort of case of sheet iron, having the form of the oven, but standing 2 feet high, & being so much larger than the oven as to have an intermediate space between the sides & back of 2 inches See Fig. d.d. d.d. This case should have a cast iron front 24 inches square, in which there must be an opening for the Mouth of the oven, 20 inches by 10. It should be 4 inches from the top of the plate or front, See Fig 1. M. M. The Mouth of the oven is to be riveted to the front of the case at this opening, & should be further secured in its place by having a bar of iron pass under the back part of it, the ends of which shall be riveted to the outer case. A door Fig 1. C, must be fitted to the oven, having a small hole nigh the bottom to let in air; which should have a slide to close it - Fig. 1. f. There should also be a hole of about 2 inches high or in the top of the oven, which should also have a slide. A tube Fig 1. g.g should be fitted to it, leading into the flue, or back thro. the case, to carry off the vapor from the oven.

Fig 1. e, e, e. - Parallel to the top of the oven, and 2 inches above it, there must be a plate or sheet of iron fitted to the form of the outer case except that it should come within 2 inches of the front of the case - The edge of the plate should be secured to the case by rivets, or otherwise. The smoke will pass between the oven top and this plate, & over it into the flue. There should be a circular opening of about 2 inches in the front plate, immediately over the oven;
to introduce a brush or scraper to clean out soot. Fig 1. h. h. a cap or stopper must be
fitted to it. At the bottom of the front plate under the oven, there must be a square
opening 8 inches broad & 7 inches high Fig 1. e. e, & a door, k. fitted to it. Thro. this the fuel
is dropt into the furnace. A top with a neck to receive ~~the furnace~~ funnel must be fitted close
& riveted upon this case Fig 1. f. f. – Should sheet iron be used for the front, it should have a
swell to give it firmness. A case of tin or other polished metal Fig 2, of the same form as the
sheet iron case, but so much larger as to have an intermediate space of 2 inches, must be fitted
over the whole. A square opening Fig 2. a. a. a. a. should be left to get at the doors &c, which may
be closed by a door b. b. – a hole c for the funnel & other holes e. e. may be left for saucepans, the
the bottoms of which will rest upon the top of the case. –

When heat is wanted to warm an apartment; part of the reflector may be taken off, for which
purpose it may be made in detached pieces, or it may have doors at the sides, to be opened
occasionally. This case & oven should be so placed over a furnace as to exclude all air except what
passes thro. the fire. It is particularly calculated for the furnace with reflectors lately invented –
The construction of the oven above described, appears most suitable for culinary purposes.

The material, size; form, and proportions may be varied at pleasure, seas to be suited to
Manufacturers, Mechanics & others. It is unnecessary to mention the various modes in which reflec-
-tors may be applied to shut in heat and constitute what may be called an oven, in the
sense in which it should be understood in this Specification.

In testimony that the above is a true Specification of my said improvement, as above
described, I have hereunto set my hand and seal, the twelfth day of October in the
year of our Lord One thousand eight hundred and twenty nine.

Joseph Hurd Jr

Witnesses
A. W. Payne }
Freeman Atwood }

I certify that the within Patent was entered on Record at the
United States Patent office on the 14th of November 1829
John D. Craig
Superintendent of the Patent office Patent office 16th Nov. 1829

(1004 words)

Exd. W.G.E.

United States Patent
Patent No.: X5704
J. Hurd. Jr,
Domestic Boiler.
Patented Nov. 10, 1829.
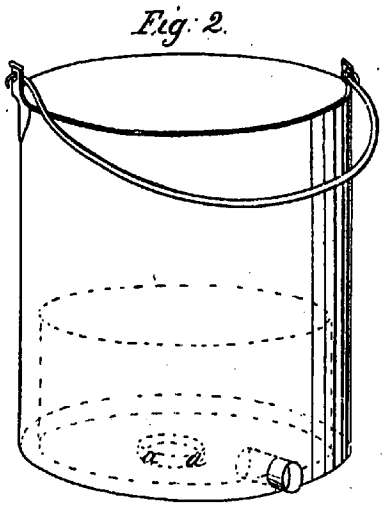
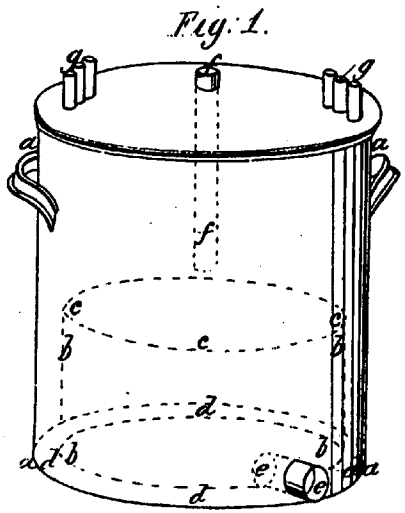
N. PETERS, PHOTO-LITHOGRAPHER, WASHINGTON, D. C.

United States Patent
Patent No.: X5704
J. Hurd, Jr.
Hot-Air Furnace.
Patented Nov. 10, 1829.
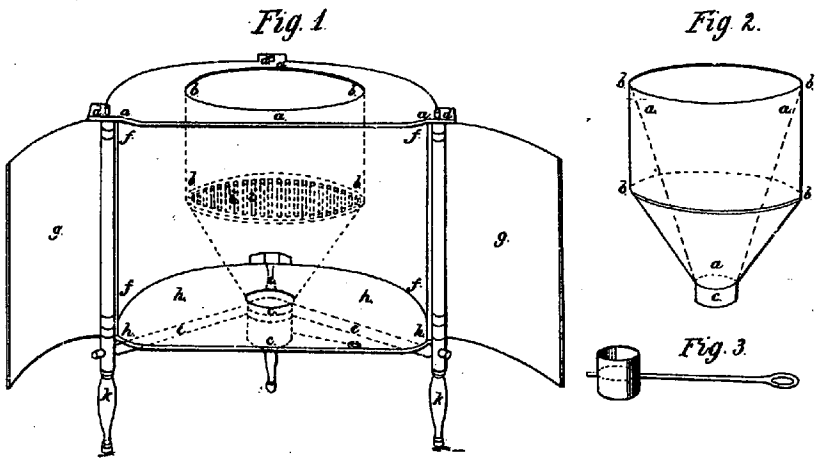
W. PETERS, PHOTO-LITHOGRAPHER, WASHINGTON, D. C.